Dec. 15, 1964    W. A. BIERMANN ETAL    3,161,758
SEQUENCE CONTROL FOR ELECTRIC CIRCUITS
Filed Sept. 5, 1961    4 Sheets-Sheet 1
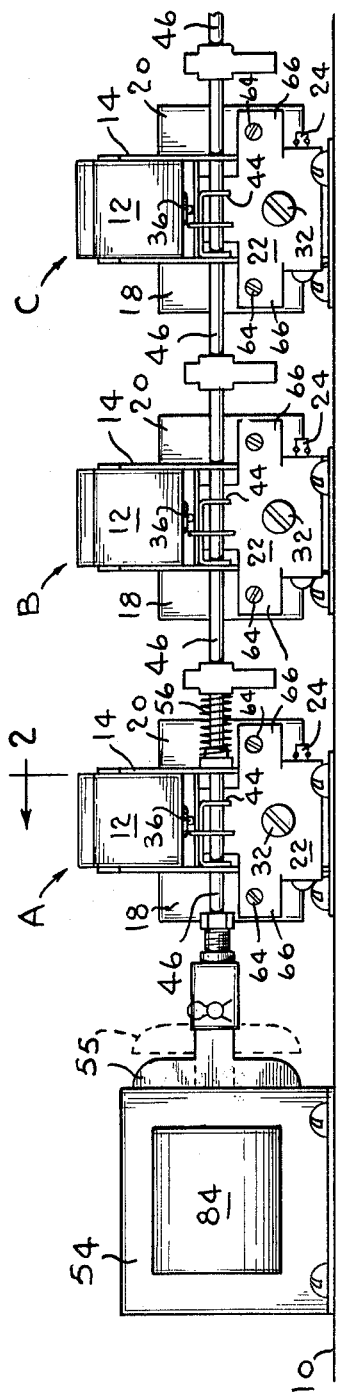
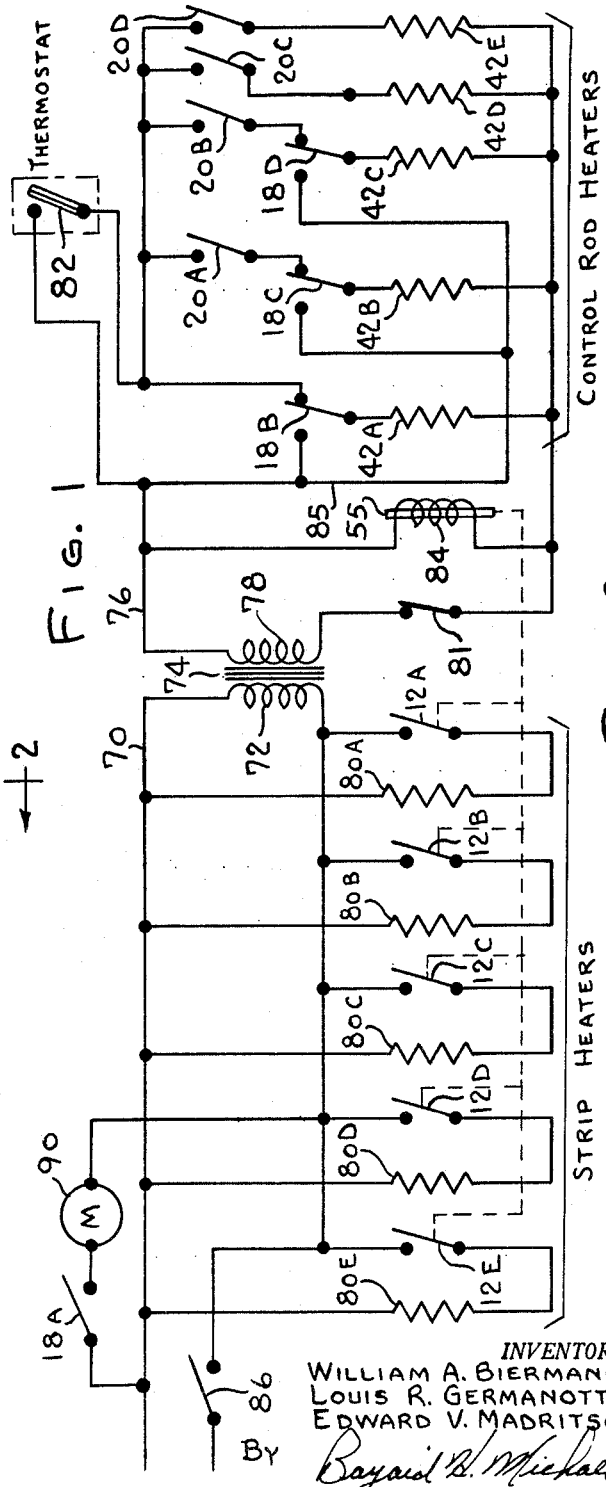
INVENTORS
WILLIAM A. BIERMANN
LOUIS R. GERMANOTTA
EDWARD V. MADRITSCH
BY
ATTORNEY INVENTORS
WILLIAM A. BIERMANN
LOUIS R. GERMANOTTA
EDWARD V. MADRITSCH
BY Bayard H. Michael
ATTORNEY

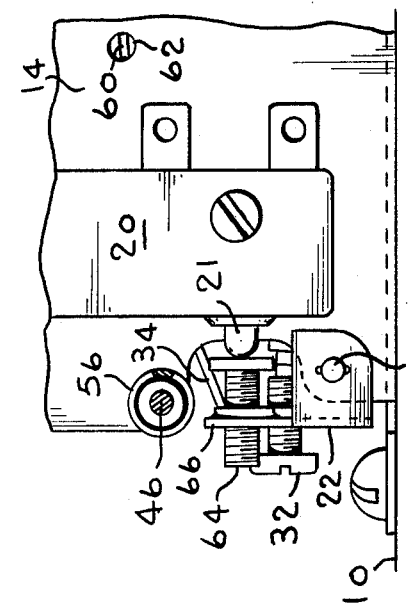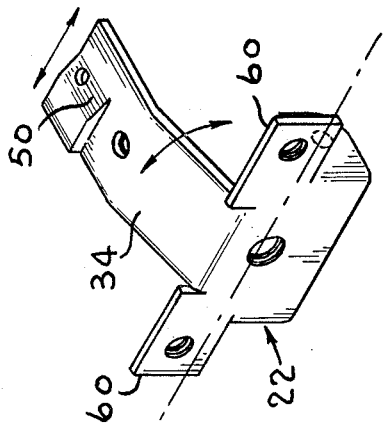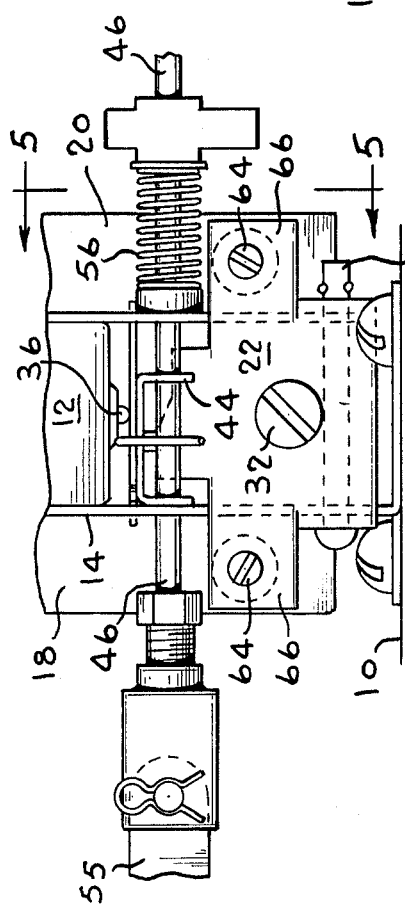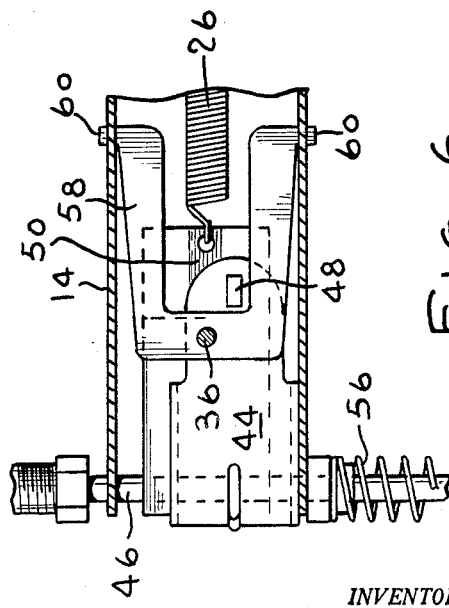

United States Patent Office 3,161,758
Patented Dec. 15, 1964

3,161,758
SEQUENCE CONTROL FOR ELECTRIC CIRCUITS
William A. Biermann, Brookfield, and Louis R. Germanotta and Edward V. Madritsch, Milwaukee, Wis., assignors to Controls Company of America, Schiller Park, Ill., a corporation of Delaware
Filed Sept. 5, 1961, Ser. No. 135,855
11 Claims. (Cl. 219—480)

This invention relates generally to an automatic control for electric heating equipment and more particularly to an improved control for sequentially energizing and de-energizing a number of electric heating devices.

An electric heater has its highest heat output and highest resistance after it has had time to warm up. When the heater is cold the resistance is appreciably lower and the current flow into the heater is markedly higher than in the normal hot operation of the heater. Therefore, when an electric heating system is involved the approach generally followed is to provide a number of heating units which are thrown onto the line at spaced intervals when there is a demand for heat. By so sequencing the heaters the in-rush current is kept to that associated with one heater element rather than that which would be encountered if all heating elements were thrown on the line at one instant. This control of the in-rush current is required by the various utility companies so that the electric heating system will not throw the rest of the electric distribution systems out of balance.

Present electric heating system controls follow this sequencing pattern mentioned above but when the thermostat is satisfied all of the heating units are removed from the line at one time. This places the electric heating system at somewhat of a disadvantage in that the heat provided when there is a demand for heat does not initially equal the full capacity of the system whereas a gas or oil filled unit will obviously come out at full capacity and provide more instantaneous heat than is possible with the electric system. In the present controls an additional disadvantage is found in that as additional banks are thrown on the line the load carried by the thermostat changes and this changes the heating rate of the heat anticipator in the thermostat and, hence, changes the anticipation of the thermostat.

The object of this invention is to provide a control which improves upon prior controls for electric heat systems.

Another object of the invention is to de-energize the electric heat units in sequence when the thermostat is satisfied with provision for resuming the re-energization of the heating units whenever the thermostat calls for heat and without requiring that the system start from a fully de-energized condition.

Still another object of this invention is to provide a control for electric heat systems which will improve upon the comfort level in the heated space.

A further object of this invention is to maintain the anticipation of the thermostat reasonably constant and in any event improve over prior systems.

In the practice of this invention a control is provided for an electric furnace having a plurality of heat banks or strip heaters. When the room thermostat calls for heat the first bank is turned on and after a time delay the next bank will be added to the load on the line. Following an additional time delay the third bank will be added to the line and so forth until all the banks are on the line or until the thermostat is satisfied. When the thermostat is satisfied the heat banks previously put on the line are removed from the line in sequence with a time delay between each removal. Therefore, should the thermostat call for heat after only a portion of the heat banks have been removed from the line the control will immediately start adding heat banks to the line. Under circumstances of moderate to heavy heat demand it will be appreciated that the furnace will seldom go to the condition where all the heat banks have been removed from the line. This achieves a modulating effect in the system providing for some heat flow at virtually all times during periods of reasonably heavy heat demand. This achieves a high degree of comfort in the heated space and avoids the long wait for full heat which was inherent in the prior art designs. Due to a novel transfer switching arrangement the number of control modules affecting the room thermostat characteristics is kept to a maximum of two regardless of the number of banks controlled by the thermostat. Under this arrangement the anticipation of the thermostat is maintained substantially uniform and unaffected by the addition or subtraction of heat banks to or from the system.

Other objects and advantages will be pointed out in, or be apparent from, the specification and claims, as will obvious modifications of the two embodiments shown in the drawings, in which:

FIG. 1 is a view of a number of switch modules connected to a solenoid actuated control rod;

FIG. 4 is a view partly broken away of the safety system for the switch actuation;

FIG. 5 is a view taken on line 5—5 of FIG. 4 showing the adjustable actuator for the transfer switches;

FIG. 6 is a top view of the actuator for the main switch;

FIG. 7 is a view of the cam on the switch actuator;

FIG. 8 is a view of the circuit diagram for the system;

Figure 2:
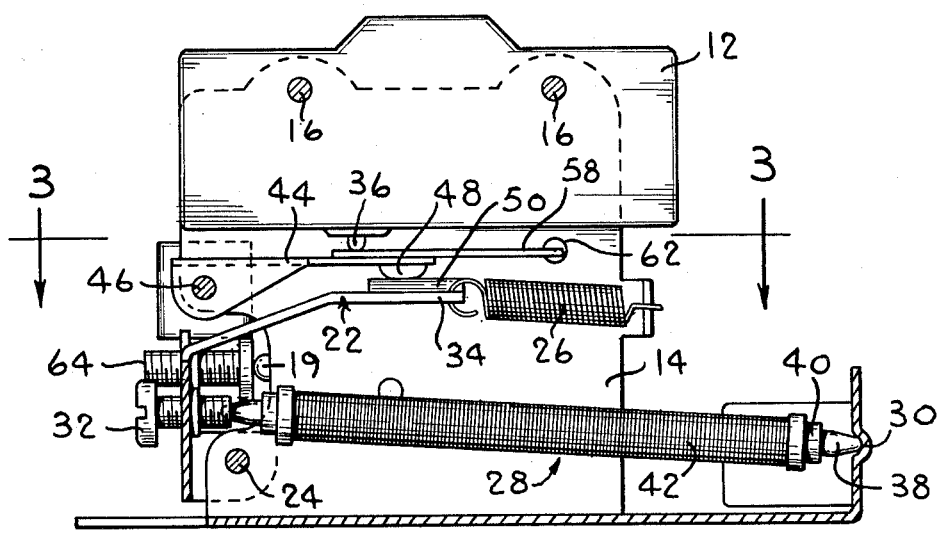
FIG. 2 is a view taken on line 2—2 of FIG. 1 showing the thermal rod in a switch module.
Figure 3:
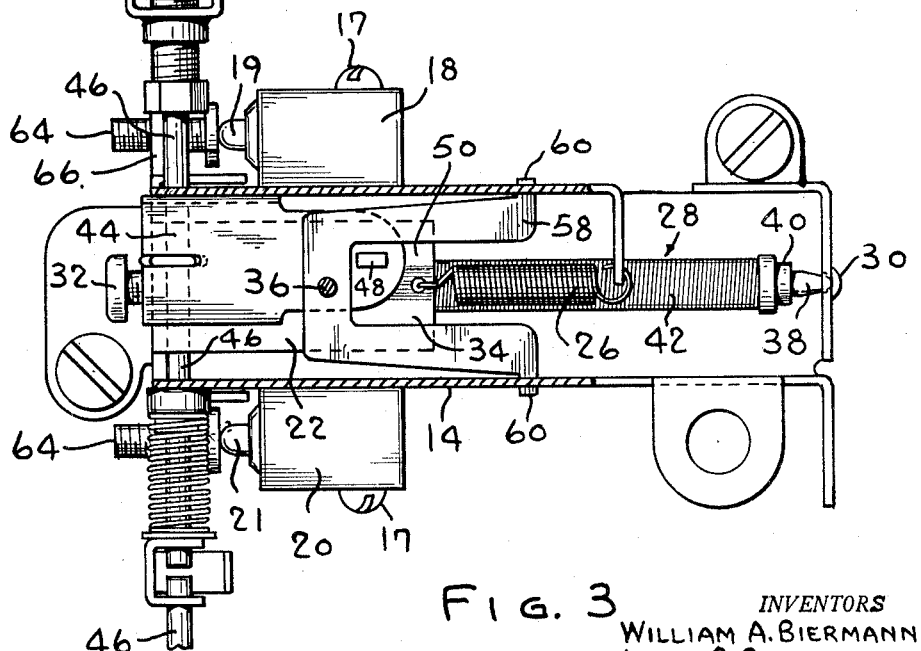
FIG. 3 is a view taken on line 3—3 of FIG. 2 showing the strip heater switching system.

Referring to the drawings, particularly FIG. 1, a number of switch modules A, B, C, etc. are shown mounted on a common base 10. Any number of modules may be used, with one module being required for each heater in the system. Each module includes a main load switch 12 centrally mounted on bracket 14 by screws 16 and two single pole double throw transfer switches 18 and 20 mounted on either side of the bracket by screws 17. Lever 22 is pivoted on the bracket on pin 24 and is biased by spring 26 in a clockwise direction (FIG. 2) to force adjusting screw 32 against one end of thermal rod 28, the other end of which is positioned in notch 30 at one end of the bracket. The position of the arm 34 of the lever is set relative to plunger 36 of the main load switch by the adjusting screw. The thermal rod includes a stainless steel pin 38 positioned within a ceramic tube 40 on which a heating coil 42 is wound. When the coil is energized the steel pin will expand causing the thermal rod to expand and force the lever to rotate counterclockwise.

The motion of lever 22 is picked up by follower 48 on the underside of switch actuator 44 pivoted on pin 46. The normal motion of lever 22 imparted to the switch actuator is insufficient to actuate the switch 12 through plunger 36 and it is necessary that some initial motion be imposed on actuator 44. Actuator 44 is axially fixed on pin 46 while being pivotally mounted thereon. The pins 46 of the various modules are interconnected and, as seen in FIG. 1, are actuated by solenoid 54 against the bias of return spring 56. It will be noted that arm 34 of lever 22 is actuated by the thermal rod and has a cam surface 50 on the upper surface of the arm. When the solenoid is actuated the various pins 46 are pulled to the left (FIG. 1) to cause the cam followers 48 to ride up the cam surface 50 and thereby move the switch actuator closer to the switch and thus reduce the amount of motion necessary to actuate the switch. The remaining amount of motion is derived from the expansion of the thermal rod and consequent actuation of lever 22. From this it should be apparent that if the solenoid is not actuated it is not possible to actuate the various main switches 12 and, hence, the solenoid can serve as a safety device which, upon de-energization, will shut off the entire system, as will be explained more fully hereinafter. An intermediate nylon leaf 58 having tabs 60 pivoted in apertures 62 in the bracket has its free end positioned between the switch actuator and the main load switch plunger to prevent galling by the plunger when the switch actuator is moved by the solenoid. Actuator 44 could be made of nylon if desired, thus eliminating the necessity of using leaf 58.

A pair of adjusting screws 64 are provided on side arms 66 of lever 22 and engage plungers 19 and 21 of the transfer switches. These screws are adjusted to that the transfer switches will be actuated by the motion of the lever simultaneously with the main load switch. Each module is, therefore, designed to actuate three switches simultaneously when the thermal rod is energized and the switch actuators are moved to engage the high point of the cam. The transfer switches are connected, as seen in FIG. 8, to provide for the sequential energizing and de-energizing of the switch modules and, consequently, the sequential energizing and de-energizing of the banks 80 of the strip heaters.

In the circuit diagram primary circuit 70 is connected to primary winding 72 of step down transformer 74, and secondary circuit 76 is connected to secondary winding 78 of the transformer. The banks 80A, 80B, 80C, 80D, and 80E of the strip heaters are connected in parallel across the primary circuit with the main load switches 12A, 12B, 12C, 12D, and 12E connected in series with its respective heater bank. An anticipating type thermostate 82 is connected in series with the secondary winding of the transformer with heater coils 42A, 42B, 42C, 42D, and 42E connected in parallel across the secondary circuit with the normally closed contacts of transfer switches 18B, 18C, and 18D connected in series with heater coils 42A, 42B, and 42C respectively. A shunt circuit 85 is connected to the normally open contact of transfer switches 18B, 18C, and 18D so that closing of these switches will place heater coils 42A, 42B, and 42C in parallel with the secondary winding of the transformer.

To place the system in operation line switch 86 is closed energizing solenoid coil 84 which is connected across the secondary of the transformer, it being understood that a normally closed limit switch 81 is closed. With coil 84 energized the solenoid will pull the various pins 46 to the left (FIG. 1) to, in effect, ready the system for operation.

When thermostat 82 closes, heater coil 42A will be energized through the normally closed contact of transfer switch 18B. When the thermal rod 28A has expanded sufficiently to close switch 12A and transfer switch 20A, heater bank 80A and thermal rod heater coil 42B will be energized. Two thermal rod heater coils are now energized through the thermostat establishing a constant line current for the anticipator in the thermostat. Expansion of thermal rod 28B will close switches 12B and 20B and open the normally closed contact of transfer switch 18B while closing the normally open contact of switch 18B. Heater coil 42A will now be connected to shunt circuit 85 and heater 42C and heater bank 80B will be energized. Energization of heater coil 42C will expand rod 28C and close switches 12C and 20C and the normally open contact of switch 18C and open the normally closed contact of switch 18C. Heater bank 80C and thermal rod heater 42D will now be energized and thermal rod heater coil 42B will be connected to the shunt circuit. Heater coil 42D will expand rod 28D to close switches 12D, 20D and the normally open contact of switch 18D, energizing heater bank 80D and thermal rod heater coil 42E and transferring heater 42C to the shunt circuit.

Heater coil 42E will expand rod 28E to close switch 12E and energize heater bank 80E. Thermal rod heater coils 42D and 42E will be left in the thermostat circuit to maintain a constant current through the thermostat anticipator.

When thermostat 82 opens thermal rod heater coils 42D and 42E will be immediately de-energized to start the de-energizing of the strip heaters. After a short time delay switches 12D and 12E will be opened substantially simultaneously de-energizing heaters 80D and 80E. The normally open contact of switch 18D will be opened and the normally closed contact of switch 18D and switch 20D is closed by the contraction of thermal rod 28D. Heater coil 42C will be de-energized and after a short time rod 28C will contract to open switch 12C and the normally open contact of switch 18C and close the normally closed contact of switch 18C and switch 20C. Heater bank 80C and thermal rod heater coil 42B will be de-energized. Thermal rod 38B will contract, opening switch 12B and the normally open contact of switch 18B, de-energizing heater bank 80B and thermal rod heater coil 42A, and closing switch 20B and the normally closed contact of switch 18B. Thermal rod 38A will contract to open switch 12A and switch 20A, de-energizing heater bank 80A. It should be noted that heater coils 42D and 42E could be connected for sequential de-energization but are not in order to maintain a constant current through the thermostat.

In the event that an overload condition is encountered, limit switch 81 will open de-energizing the secondary circuit and solenoid coil 84. When the limit switch opens, there would normally be a slight time delay before the main load switches opened because of the time required for the thermal rods to contract. In order to obtain an instant opening of the strip heater switches, coil 84 is de-energized releasing plunger 55 and pins 46 which will move to the right due to the bias of spring 56. Switch actuators 44 will be moved to the right (FIG. 1) and cam follower 48 will slide down cam surface 50 allowing switches 12 to open immediately.

Figure 9:
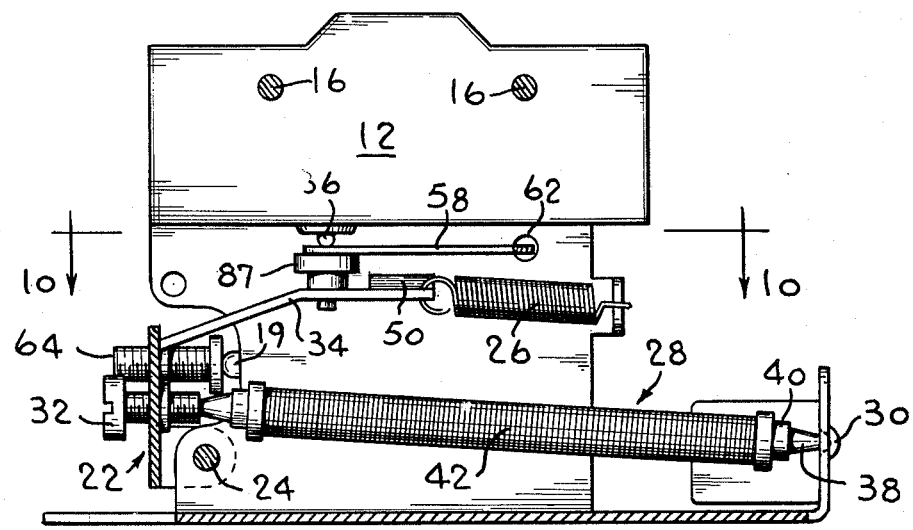
FIG. 9 is a side view of the switch module without overload.
Figure 10:
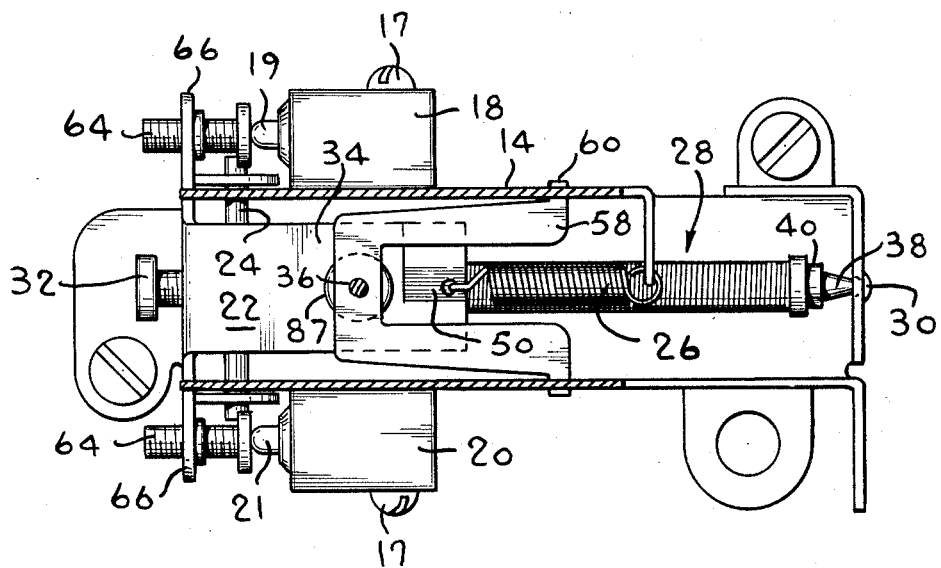
FIG. 10 is taken on line 10—10 of FIG. 9 showing the switch lever.

If the modules are to be used without the limit switch, switch actuators 44 and rods 46 are removed from the module as shown in FIGS. 9 and 10. A button 87 is mounted on thermal rod lever 22 to engage the nylon leaf and actuate switch 12. The modules will operate exactly as described above, sequencing the heater banks on and off.

In normal operation, it is desirable to start a furnace blower simultaneously with the energization of the first bank of strip heaters. This is shown in FIG. 8 where blower motor 90 is connected across the primary circuit in series with the normally open contact of transfer switch 18A. When thermal rod 38A closes switch 12A and the normally open contact of switch 18A, both heater 80A and the blower will be energized. Since the fan is operated by the transfer switch on the "A" module, the blower will be energized first and remain energized until the last bank of strip heaters is de-energized. This arrangement will allow the blower to run for a short period of time after the limit switch is opened, since the normally open contact of switch 18A will not open until thermal rod 38A has contracted far enough to actuate the switch.

Although only two embodiments of the present invention have been illustrated and described, it will be apparent to those skilled in the art that various changes and modifications may be made therein without departing from the spirit of the invention or from the scope of the appended claims.

We claim:

1. A control system for sequentially energizing and de-energizing a number of electric heaters comprising, a transformer having primary and secondary windings, a primary circuit connected to the primary winding, a number of heaters connected to the primary circuit, a switch connected in series with each heater, a source of potential for the primary circuit, a secondary circuit connected to the secondary winding, a number of electrically energized time delay devices connected to the secondary circuit, said delay devices each controlling the opening and closing of one of the heater switches, first transfer switch means connected in series with each delay device and controlled by operation of the preceding delay device for sequentially energizing the delay devices upon energization of the secondary circuit, the circuit means connected to the delay devices and controlled by the succeeding device for sequentially de-energizing the devices upon de-energization of the secondary circuit to effect a sequential energizing and de-energizing of the heaters.

2. A control system for sequentially energizing and de-energizing a number of electric heaters comprising, a number of switching devices each including an electrically energized time delay device, a main switch and a pair of transfer switches, the main switch of each device being adapted to control the energization of one of the electric heaters, circuit means for energizing the delay devices, one of the transfer switches for each device being connected in the circuit means to control the energizing of the delay device of the next succeeding sequentially arranged switching device, the other transfer switch in each device being connected in the circuit means to provide a reverse de-energizing of the switching devices.

3. An electric heating system comprising, a plurality of heaters, an electric circuit for the heaters, a switch associated with each heater for placing each heater in the circuit, a thermostat in the circuit, a plurality of electrically energized switch actuators arranged with one actuator associated with each switch and each actuator connected in the circuit to be controlled by the thermostat, each actuator having delayed response upon energization, and means associated with each actuator and operable upon the actuator operating its associated switch to energize the next actuator, whereby the heaters are placed in circuit in sequence, and means for removing said actuators from control by the thermostat in sequence as the next successive heater is added to the circuit.

4. A control system for sequentially energizing and de-energizing a number of electric heaters comprising, a transformer having primary and secondary windings, a primary circuit connected to the primary winding, a number of heaters connected to the primary circuit, a switch connected in series with each heater, a source of potential for the primary circuit, a secondary circuit connected to the secondary winding, a number of electrically energized time delay devices connected to the secondary circuit, said delay devices each controlling the opening and closing of one of the heater switches, first transfer switches connected in series with each delay device and controlled by the preceding delay device for sequentially energizing the delay devices upon energization of the secondary circuit, circuit means connected to the delay devices and controlled by the succeeding devices for sequentially de-energizing the devices upon de-energization of the secondary circuit to effect a sequential energizing and de-energizing of the heaters, said circuit means including a shunt circuit connected to the secondary winding of the transformer, and a second transfer switch controlled by each delay device for switching the preceding delay devices to the shunt circuit upon energization of the succeeding device, said second transfer switches being opened in reverse sequence upon de-energization of each succeeding device to effect a reverse sequential de-energization of the devices.

5. A control system according to claim 4 including a thermostat connected to the secondary circuit to energize the secondary circuit at a predetermined temperature, said shunt circuit maintaining the energization of the delay devices after the thermostat is opened to allow for the sequential de-energization of the delay device.

6. A switch module for a sequential time delay system comprising, a housing, a main switch and a pair of transfer switches mounted on the housing, a lever pivotally mounted in the housing and positioned to operatively engage the transfer switches, heat motor means for actuating the lever to actuate the switches, said lever including a cam surface, a second lever pivoted in the housing and having a portion interposed between the first lever and the main switch and being movable by the lever and also being movable with respect to the cam surface from an operative to an inoperative position with respect to the main switch, whereby said second lever is inoperative to actuate the main switch when moved to the inoperative position.

7. A switch according to claim 6 including leaf means positioned between the second lever and the main switch to prevent galling of the second lever during the motion of the second lever with respect to the cam surface.

8. A system for actuating a plurality of switch modules as set forth in claim 6 to sequentially energize a number of electric heaters comprising, a heater connected in circuit with the main switch of each switch module, said heat motor means being electrically energized, the heat motor means of the switch modules being connected in parallel in the circuit, said switch modules being arranged in a numerical sequence, one of the transfer switches of the lower order number module being normally opened and connected in series with the next succeeding higher order heat motor means, the other transfer switch being connected in series with the next succeeding lower order heat motor means, whereby on energization of the heat motor of the lower order switch module the main switch will be closed to energize one of the electric heaters and the transfer switches will be actuated to close the circuit to the next succeeding higher order heat motor means and open the circuit to the next succeeding lower order heat motor means.

9. A system according to claim 8 including a thermostat in circuit to control the heat motor means, and a shunt circuit shunting the thermostat, said other transfer switch connecting the heat motor means of the lower order switch module to the shunt circuit upon actuation of the transfer switches to thereby allow for the sequential de-energization of the heat motor means after the thermostat is opened.

10. A system according to claim 9 including blower means connected in circuit with the electric heater means, the other transfer switch of the lowest numerical switch module being connected to control the energizing of the blower means whereby said blower means is energized first and de-energized last.

11. A control system for sequentially energizing and de-energizing a number of electric heaters comprising, a switch connected in series with each heater, a number of electrically energized time delay devices connected to and controlling the opening and closing of respective ones of said heater switches, first transfer switch means connected in circuit with each time delay device and controlled by the preceding time delay device for sequentially energizing the delay devices, and circuit means connected to the delay devices and controlled by the succeeding device for sequentially de-energizing the devices upon de-energization of said circuit so that said heaters are connected for sequential energization and de-energization.

References Cited in the file of this patent

UNITED STATES PATENTS

| | | |
|---|---|---|
| 510,889 | Butz | Dec. 19, 1893 |
| 2,352,930 | Anderson | July 4, 1944 |
| 2,578,340 | De Lancey | Dec. 11, 1951 |
| 2,583,397 | Strysko | Jan. 22, 1952 |
| 2,993,106 | Maudlin et al. | July 18, 1961 |
| 3,052,788 | Peters | Sept. 4, 1962 |